Patented Feb. 28, 1950

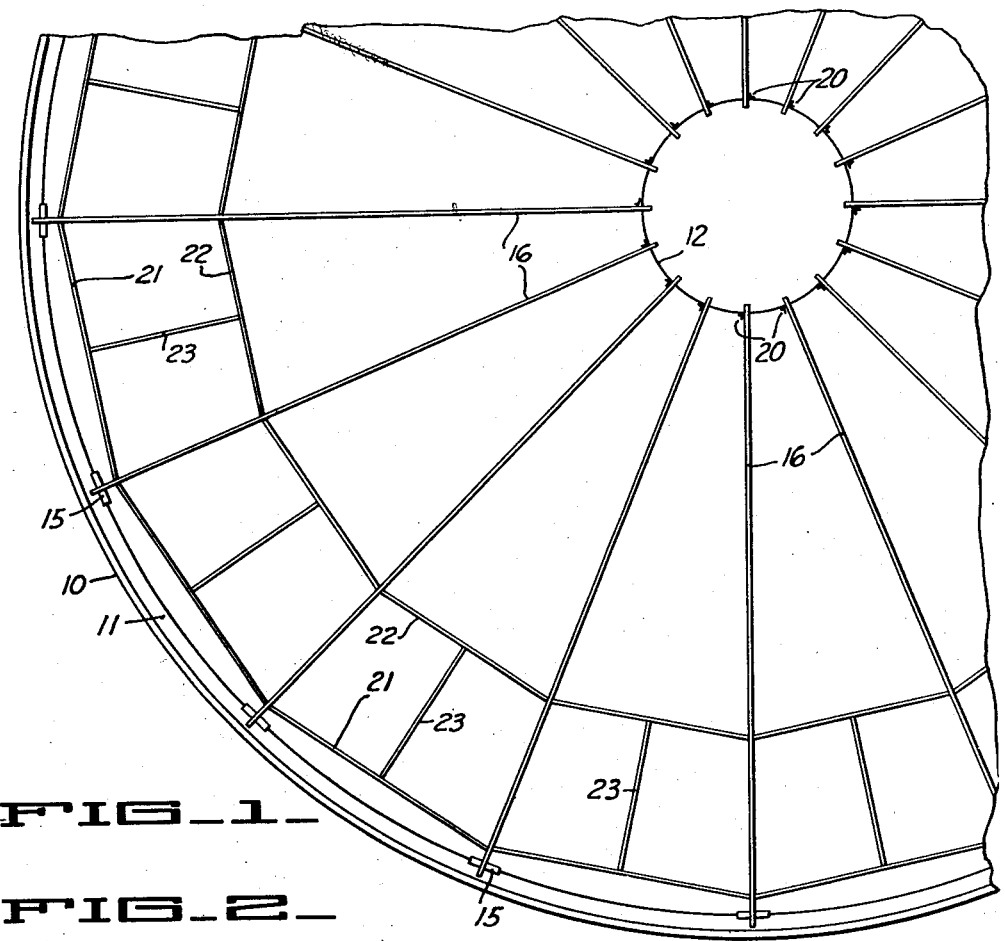
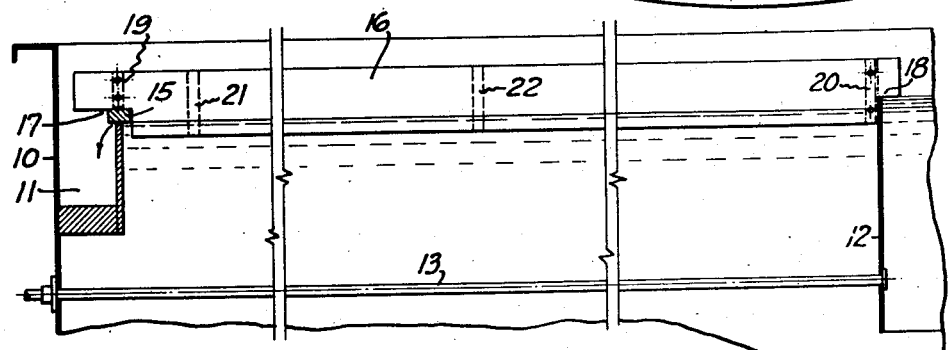

2,499,054

UNITED STATES PATENT OFFICE 2,499,054

LIQUID TREATMENT APPARATUS

Neil R. Collins, Los Altos, and Albin E. Esterberg, Redwood City, Calif., assignors to Marine Magnesium Products Corporation, South San Francisco, Calif., a corporation of Delaware Application February 2, 1946, Serial No. 645,086

1 Claim. (Cl. 210—51)

This invention relates generally to apparatus such as gravity settlers, clarifiers, thickeners or classifiers, where it is important to maintain the body of liquid undergoing treatment relatively quiescent.

When apparatus of the above character is installed in locations exposed to wind it is frequently necessary to provide means to avoid objectionable wave action, particularly where the tank is of relatively large size. Wave action tends to cause agitation of the body of liquid undergoing treatment, thus interfering with the desired settling action. One method of preventing wave action is disclosed and claimed in Patent 2,287,975, and involves use of a buoyant cover which floats upon the surface of the liquid, and which is made in sections having articulated connection with each other and to the tank. While a floating structure of this type is capable of suppressing wave action it has the disadvantage that it becomes waterlogged, thus requiring replacement at frequent intervals.

It is a general object of the invention to provide improved apparatus of the above character which will suppress wave action without the use of either permanent or floating covers.

Another object of the invention is to provide improved apparatus of the above character which is relatively simple in construction and requires a minimum of servicing.

Further objects of the invention will appear from the following description in which the preferred embodiment has been set forth in detail in conjunction with the accompanying drawing.

Referring to the drawing—

Figure 1 is a plan view showing a clarifier tank equipped in accordance with the present invention.

Figure 2 is a side elevational detail in cross section, illustrating the manner in which the structural baffles are attached to the tank.

Figure 3 is a partial plan view on a larger scale.

The apparatus shown in Figure 1 consists of a circularly contoured tank 10 having an overflow launder 11 extending entirely about its periphery. The center of the tank is provided with a well or chamber 12 into which the liquid feed is introduced, and from which the liquid flows out into the main tank. One or more pipes 13 can be provided for introducing the liquid feed into the well.

Assuming that the apparatus is used to settle out solids to provide a thickened underflow and a clarified overflow, it is important that the body of the liquid undergoing treatment remain relatively quiescent and particularly the liquid in the region adjacent the overflow launder. As disclosed in said Patent 2,287,975 waves produced by wind blowing upon the surface of the liquid tend to cause an unequal spill-over of overflow water into the launder 11 at different points about the periphery of the tank, and in addition the wave action extends downwardly into the body of the liquid to cause agitation which hinders normal settlement of solids. A common difficulty experienced in conjunction with wave action is clouding of the overflow, where normally the overflow is a clear liquid.

The wave suppressor which we utilize consists of a plurality of radially extending structural baffles 16 which extend from the overflow launder 11 to the well 12. These baffles can be formed of wood planks or boards of substantial width in a vertical direction, and of sufficient strength to enable attachment only at their ends.

For convenient support of the baffles 16 their outer ends are notched as indicated at 17, to enable these ends to rest upon blocks 15 which in turn are carried by the lip of the launder 11. The inner end of each baffle 16 is similarly notched as indicated at 18, to enable this end to rest upon the lip of the well 12. Suitable means such as angularly bent metal straps 19 can be provided for making attachment between the outer ends of the baffles and the launder 11, and similar attaching means 20 can be provided between the inner ends of the baffles and the walls of the well.

Extending between the baffles 16 are the spaced baffles 21, 22 which can likewise be formed of wood boards the same as baffles 16. The ends of baffles 21 are attached at spaced intervals to baffles 16 by suitable means, such as nails, etc., to extend as chords tangential to the center of the tank. Baffles 21 are disposed relatively close to the overflow launder as shown. Additional radial baffles 23 can extend between baffles 21 and 22.

All of the baffles are dimensioned and positioned upon the tank in such a manner that the lower part of each baffle extends into the liquid below the normal liquid level, while the upper portions of the baffles extend well above the normal liquid level. Thus where in a typical instance the baffles are wood planks measuring 2 inches in thickness and 12 inches in width, it is satisfactory to position the baffles in such a manner that normally about one-fourth the width of the planks is submerged in the liquid, leaving the other part extending above the normal liquid level.

Our invention will effectively suppress wave action in the upper part of the tank, irrespective of the manner in which the tank is exposed to wind. The baffles tend to prevent the building up of wave energy because the stationary baffles present rigid barriers to resist wave action in any horizontal direction. Furthermore the liquid surface is broken up into a number of relatively small sections, each of which is sufficiently small to accommodate wave action of any magnitude. The fact that the baffles extend a substantial distance above the normal liquid level tends to interfere with and reduce the intensity of wind action upon the surface of the liquid, and in addition more effectively confines minor waves within the various exposed sections from slopping over into other sections.

As an example of one actual installation at South San Francisco, California, the tank measured about 90 feet in diameter and baffles 16 were 25 feet 6 inches in length and spaced 16 feet 9 inches at their outer ends. The chord baffles 21, 22 were about 10 feet apart and baffles 21 had a maximum spacing of about one foot from the lip of launder 11.

The proximity of baffles 21 to the lip of the overflow launder has been found to be quite beneficial in preventing uneven spill over into the launder and in general contributes materially to enabling the apparatus to be exposed to wind without detriment to the desired operation.

We claim:

In exteriorly installed liquid treatment apparatus, a tank for holding a body of liquid undergoing treatment, said tank being provided with centrally located means for introducing liquid material into the same and also with a peripheral overflow launder for receiving overflow material from the tank, and means for suppressing wave action in the upper exposed portion of the tank, said means comprising a plurality of radially extending baffle planks extending horizontally across the upper portion of the tank from the central portion thereof to said overflow launder, means forming fixed supports for the inner and outer ends of the planks, additional chord baffle planks extending between the radial baffles and attached to the same, all of said baffles being located above the zone of settlement of the apparatus and having such height in a vertical direction that their lower edge portions are submerged in the upper surface of the liquid and their upper edges extended for a substantial distance above the liquid surface.

NEIL R. COLLINS.
ALBIN E. ESTERBERG.

REFERENCES CITED

The following references are of record in the file of this patent:

UNITED STATES PATENTS

| Number | Name | Date |
|---|---|---|
| 1,020,013 | Arbuckle | Mar. 12, 1912 |
| 1,703,041 | Imhoff | Feb. 19, 1929 |
| 2,287,975 | Collins et al. | June 30, 1942 |